(12) United States Patent
Benedetti et al.

(10) Patent No.: US 9,477,504 B2
(45) Date of Patent: Oct. 25, 2016

(54) MAINTENANCE OF OFFLINE VIRTUAL MACHINES BASED ON A MAINTENANCE REGISTER

(71) Applicant: International Business Machines Corporation, Armonk, NY (US)

(72) Inventors: Fabio Benedetti, Rome (IT); Jacques Fontignie, Onex (CH); Claudio Marinelli, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/364,622

(22) PCT Filed: Dec. 4, 2012

(86) PCT No.: PCT/IB2012/056946
§ 371 (c)(1),
(2) Date: Jun. 11, 2014

(87) PCT Pub. No.: WO2013/088301
PCT Pub. Date: Jun. 20, 2013

(65) Prior Publication Data
US 2014/0325514 A1    Oct. 30, 2014

(30) Foreign Application Priority Data
Dec. 12, 2011   (EP) .................................... 11193047

(51) Int. Cl.
*G06F 9/455*   (2006.01)
*G06F 9/445*   (2006.01)

(52) U.S. Cl.
CPC ............. *G06F 9/45533* (2013.01); *G06F 8/65* (2013.01); *G06F 2009/45562* (2013.01)

(58) Field of Classification Search
None
See application file for complete search history.

(56) References Cited

U.S. PATENT DOCUMENTS 7,810,092 B1 *   10/2010   van Rietschote ... G06F 9/45558
                                                709/217
8,205,194 B2 *    6/2012   Fries et al. .................... 717/168
(Continued)

FOREIGN PATENT DOCUMENTS

CN   101739007 A   6/2010
EP     2189900 A1   5/2010
(Continued)

OTHER PUBLICATIONS

Piplode et al. An Overview and Study of Security Issues & Challenges in Cloud Computing. International Journal of Advanced Research in Computer Science and Software Engineering, vol. 2, Sep. 2012. Retrieved on [Jun. 22, 2016] Retrieved from the Internet: URL<http://citeseerx.ist.psu.edu/viewdoc/download?doi=10.1.1.452.2022&rep=rep1&type=pdf>.*
(Continued)

*Primary Examiner* — Thuy Dao
*Assistant Examiner* — Cheneca Smith
(74) *Attorney, Agent, or Firm* — Stephen R. Tkacs; Stephen J. Walder, Jr.; David Zwick (57) ABSTRACT

A solution is proposed for maintaining virtual machines being available in a data-processing system. A mechanism determines a list of software components installed on each virtual machine, retrieves a set of maintenance policies for each software component, each maintenance policy being indicative of a patch to be applied to the corresponding software component. The mechanism determines a set of old virtual machines having at least one old software component thereof requiring the application of at least a new one of the corresponding patches according to a comparison among the maintenance policies and a maintenance register indicative of a current state of the software components of the virtual machines. The mechanism applies the corresponding at least one new patch to each old software component of each old virtual machine and updates the maintenance register according to the application of said at least one new patch to each old software component of each old virtual machine.

20 Claims, 5 Drawing Sheets

(56) References Cited

U.S. PATENT DOCUMENTS

| | | | |
|---|---|---|---|
| 8,359,594 B1* | 1/2013 | Davidson | G06F 9/5077 |
| | | | 718/1 |
| 8,495,609 B2* | 7/2013 | Troan | G06F 8/65 |
| | | | 717/168 |
| 8,869,142 B2* | 10/2014 | Gouge et al. | 717/177 |
| 2006/0271395 A1* | 11/2006 | Harris | G06F 9/52 |
| | | | 718/1 |
| 2007/0234343 A1* | 10/2007 | Gouge et al. | 717/174 |
| 2007/0271561 A1 | 11/2007 | Winner et al. | |
| 2008/0263658 A1 | 10/2008 | Michael et al. | |
| 2009/0007105 A1 | 1/2009 | Fries et al. | |
| 2009/0217255 A1* | 8/2009 | Troan | G06F 8/65 |
| | | | 717/168 |
| 2009/0249324 A1 | 10/2009 | Brar et al. | |
| 2009/0320014 A1 | 12/2009 | Sudhaker | |
| 2009/0328170 A1 | 12/2009 | Williams et al. | |
| 2010/0287544 A1 | 11/2010 | Bradfield et al. | |
| 2011/0029970 A1* | 2/2011 | Arasaratnam | G06F 9/45558 |
| | | | 718/1 |
| 2011/0265076 A1 | 10/2011 | Thorat et al. | |
| 2012/0151477 A1* | 6/2012 | Sinha | G06F 9/45558 |
| | | | 718/1 |
| 2013/0074072 A1* | 3/2013 | Kennedy | G06F 9/44505 |
| | | | 718/1 |

FOREIGN PATENT DOCUMENTS

| | | |
|---|---|---|
| WO | WO2009/099476 A | 8/2009 |
| WO | WO2013/088301 A1 | 6/2013 |

OTHER PUBLICATIONS

Owens, Ken. "Securing virtual compute infrastructure in the cloud." Whitepaper. SavvisCorp.[Online]. Available: http://www.savvis.com/en-us/info%5Fcenter/documents/hos-whitepaper-securingvirutalcomputeinfrastructureinthecloud. pdf (2009). Retrieved on [Jun. 22, 2016].*

Litty, Lionel et al., "Patch Auditing in Infrastructure as a Service Clouds", VEE'11, Mar. 9-11, 2011, Newport Beach, California, USA, 11 pages.

Owens, Ken, "Securing Virtual Compute Infrastructure in the Cloud", Savvis, Inc, 2009, 13 pages.

* cited by examiner

MAINTENANCE OF OFFLINE VIRTUAL MACHINES BASED ON A MAINTENANCE REGISTER

BACKGROUND

The solution according to one or more embodiments of the present invention generally relates to the data-processing field. More specifically, this solution relates to the maintenance of virtual machines.

Virtual appliances are a specific type of software appliances. In general, a software appliance is a software solution comprising a software application (i.e., one or more application programs performing a specific user task) and a Just Enough Operating System, or JeOS (i.e., a limited operating system specifically tailored to support the software application), which are encapsulated in a pre-built, self-contained package. In particular, a virtual appliance is a software appliance designed to run in a virtualized environment; for this purpose, the virtual appliance comprises one or more virtual machines (i.e., emulations by software of physical machines), each one with its operating system and application programs. Virtual appliances allow provisioning corresponding services on demand in a very fast way, by simply turning them online whenever it is necessary.

As usual, the software components (i.e., operating system and software applications) of each virtual appliance are subject to continual maintenance operations during their life cycle; particularly, patches (or fixes) are applied from time to time to upgrade the software components—for example, to correct bugs or to improve operation of the software components. For this purpose, most software components comprise an embedded updating tool, which is invoked periodically when the corresponding software component is launched. The updating tool verifies whether new patches are available on an associated central location (for example, a web site of a vendor of the software component); if so, the new patches are downloaded and applied to the software component automatically. Alternatively, "Patch Auditing in Infrastructure as a Service Clouds—Lionel Litty, David Lie—VEE'11 Mar. 9-11, 2011, Newport Beach, Calif., USA" (the entire disclosure of which is herein incorporated by reference) proposes monitoring virtual hardware to determine execution of (possibly un-patched) executable or interpreted programs.

Therefore, the software components of the virtual appliances can be upgraded only when they are online. However, the virtual appliances may be left offline for long periods of time; for example, this happens when the virtual appliances are used only sporadically, or when they are always offline because they are only used as master images (for their cloning and deployment) or as template images (for the creation of custom virtual appliances based thereon). As a result, the patches are not applied to the software components of these (quiescent) virtual appliances in a timely manner. This may cause serious issues when the missing patches are relatively important; for example, out-of-date software components may not operate properly, or they may be exposed to security vulnerabilities.

The current approach to address the above-mentioned problem is of turning online the virtual appliances periodically; a scanner (for example, an anti-virus) is upgraded and run on the corresponding virtual machines so as to discover any missing patches and apply them. However, this is very time consuming (especially in large systems that may store a high number of quiescent virtual appliances); moreover, it causes a considerable waste of system resources (for example, processing, memory and network resources) for the scanning of all the quiescent virtual appliances.

Alternatively, a service may investigate a pool of virtual machines to perform a risk analysis thereof, so as to provide some offline patching capabilities; however, this technique is implemented within a custom virtual machine architecture, so that it is not of general applicability.

For the same purpose, US-A-2009/0007105 (the entire disclosure of which is herein incorporated by reference) proposes rendering the image of each virtual machine to file-system data that is readable by another system (for example, by mounting its virtual hard drive image as a physical disk device); the rendered virtual machine may then be scanned to determine its status with respect to possible patches to be applied thereto.

In any case, the above-described techniques are not completely satisfactory. Indeed, the inspection of the offline virtual machines may sometime be ineffective in retrieving the required information, since most of the Application Program Interfaces (APIs) of the operating systems of the virtual machines are not available when they are offline.

SUMMARY

In its general terms, the solution according to one or more embodiments of the present invention is based on the idea of exploiting state information for the maintenance of offline virtual machines.

One illustrative embodiment provides a method for maintaining virtual machines, wherein old virtual machines, requiring the application of at least one new patch, are determined by comparing maintenance policies, indicative of the patches to be applied to software components, and a maintenance register indicative of a current state thereof in the virtual machines.

A further embodiment provides a corresponding computer program.

A still further embodiment provides a corresponding computer program product.

Another embodiment provides a corresponding system.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes such as value, content and representation). Particularly.

DETAILED DESCRIPTION

Figure 1:
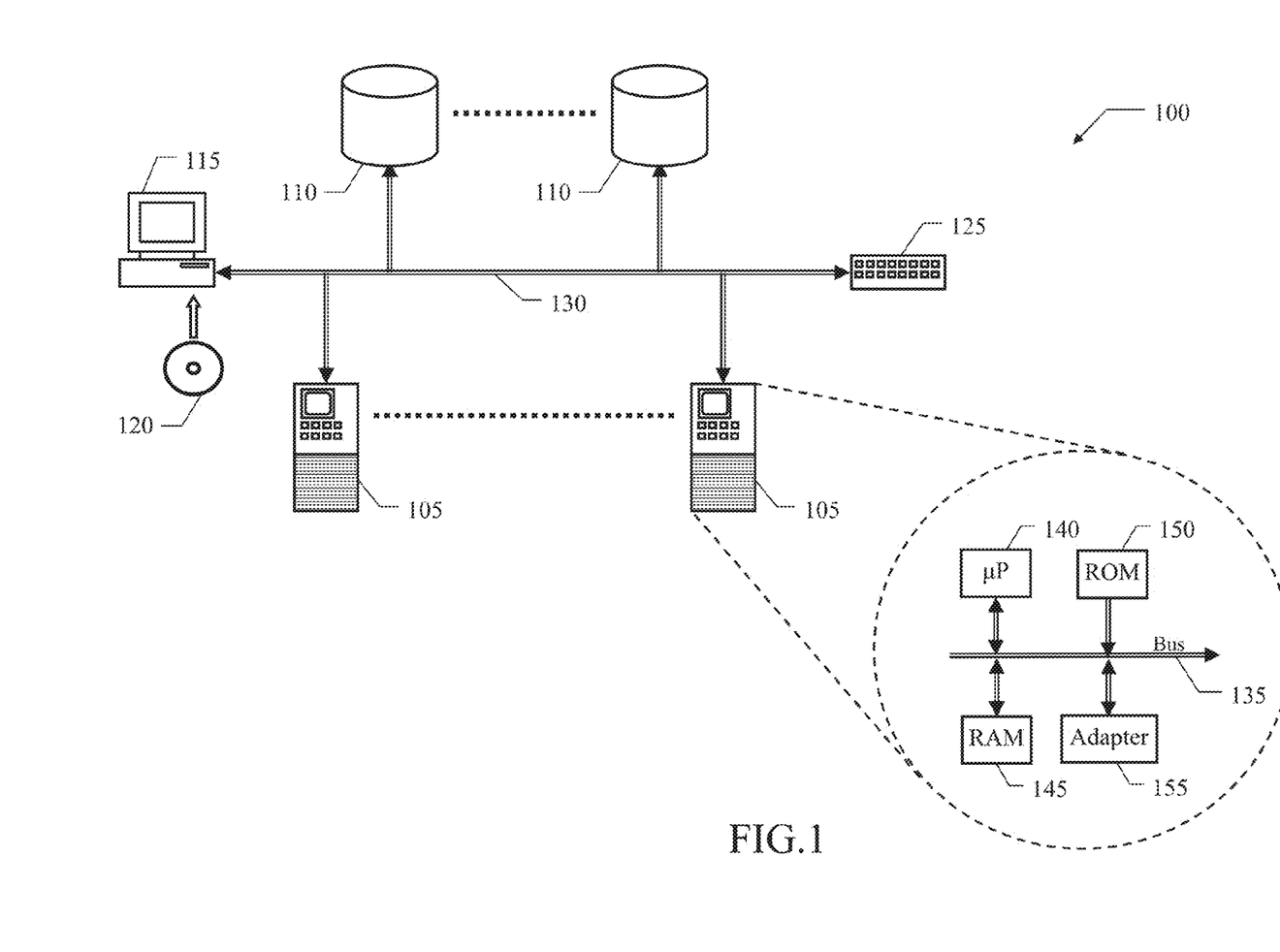
FIG. 1 shows a pictorial representation of a data-processing center wherein the solution according to an illustrative embodiment is applicable.

With reference in particular to the FIG. 1, a schematic block diagram is shown of a data-processing center 100 wherein the solution according to an illustrative embodiment may be practiced.

The data-processing center 100 is a facility that comprises a set of computers 105, a set of storage systems 110, and a console 115 for controlling them. Console 115 may also be provided with a drive for reading digital video disks (DVDs) or compact disks (CDs) 120. A router (or switch) system 125 manages communications among the computers 105, the storage systems 110 and the console 115, and with the outside of the data-processing center 100 (for example, through the Internet); for these purposes, the computers 105, the storage systems 110, the console 115 and the router system 125 are connected through a cabling system 130.

A generic computer 105 of the data-processing center 100 is formed by several units that are connected in parallel to a communication bus 135. In detail, a set of (one or more) microprocessors (μP) 140 controls operation of the computer 105; a random access memory (RAM) 145 is directly used as a working memory by the microprocessors 140, and a read-only memory (ROM) 150 stores basic code for a bootstrap of the computer 105. Moreover, the computer 105 comprises a network adapter 155, which is used to connect the computer 105 to the cabling system 130.

Figure 2:
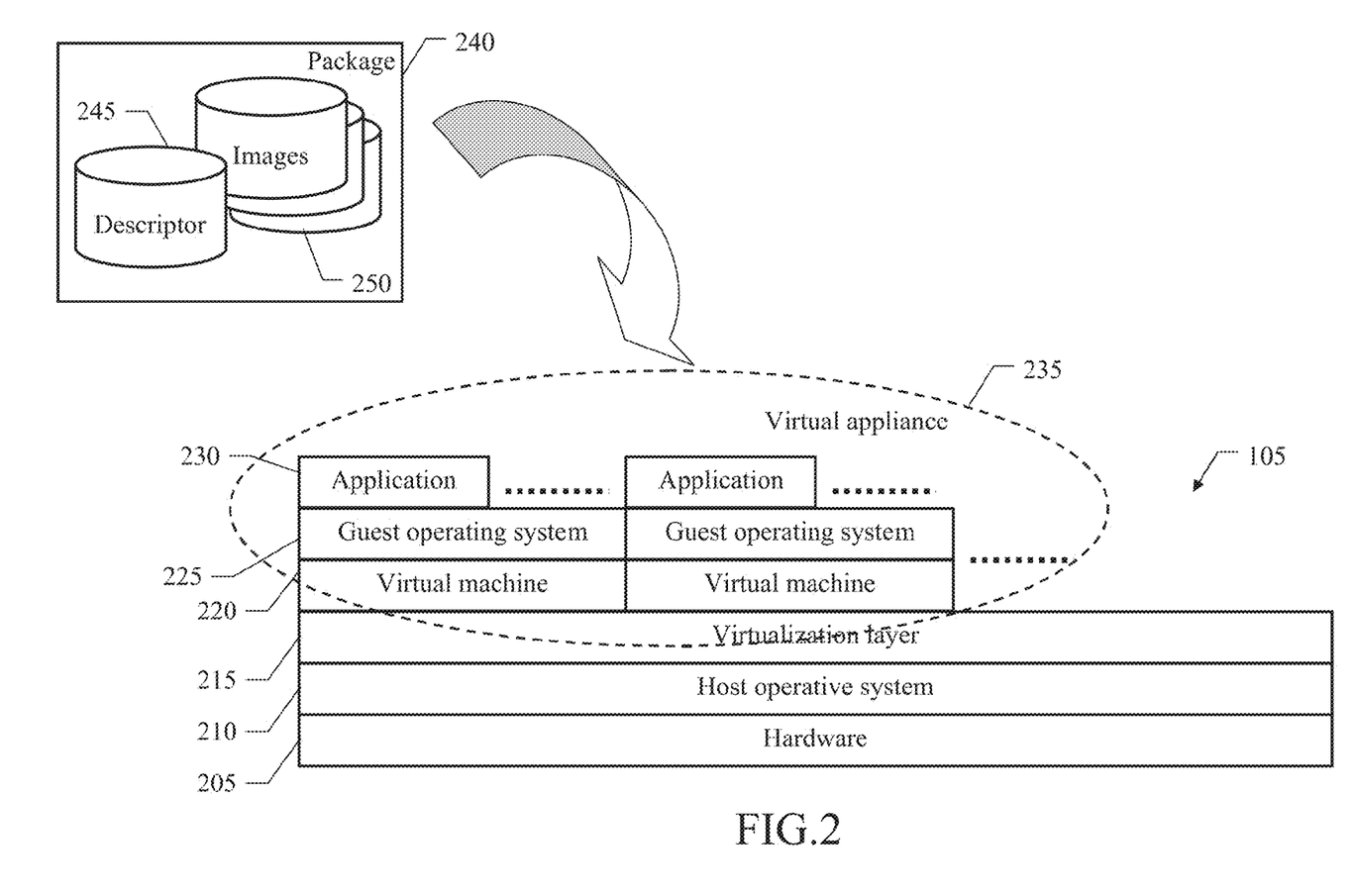
FIG. 2 shows a block diagram of an exemplary virtualized environment to which an illustrative embodiment may be applied.

A block diagram of an exemplary virtualized environment to which the solution according to an embodiment may be applied, is shown in the FIG. 2. The virtualized environment is implemented on a (physical) computer 105 of the above-described data-processing center. The above-described units of the computer 105 form its hardware, denoted as a whole with the reference 205. A host operating system 210 running directly on the hardware 205 defines its software platform on top of which any other program can run. In this specific case, a virtualization layer 215 running on top of the host operating system 210 emulates one ore more virtual machines 220, each one consisting of an abstract environment giving the appearance of a physical machine, which the virtual machine 220 has sole control of. Each virtual machine 220 comprises a guest operating system 225 now running on its emulated hardware. The guest operating system 225 likewise defines a software platform of the virtual machine 220, on top of which one or more application programs 230 run. The above-described virtual machines 220 may implement virtual appliances 235; each virtual appliance 235 comprises one or more virtual machines 220, each one with its guest operating system 225 (in this case, of the JeOS type) and one or more application programs 230, which are encapsulated in a pre-built, self-contained package 240 (for example, conforming to the Open Virtualization Format (OVF); the package 240 comprises a descriptor 245 (with metadata of the package 240 and of the virtual machines 220 composing the virtual appliance 235) and an image 250 of each virtual disk of the virtual machines 220 (consisting of a snapshot thereof).

Figure 3A:
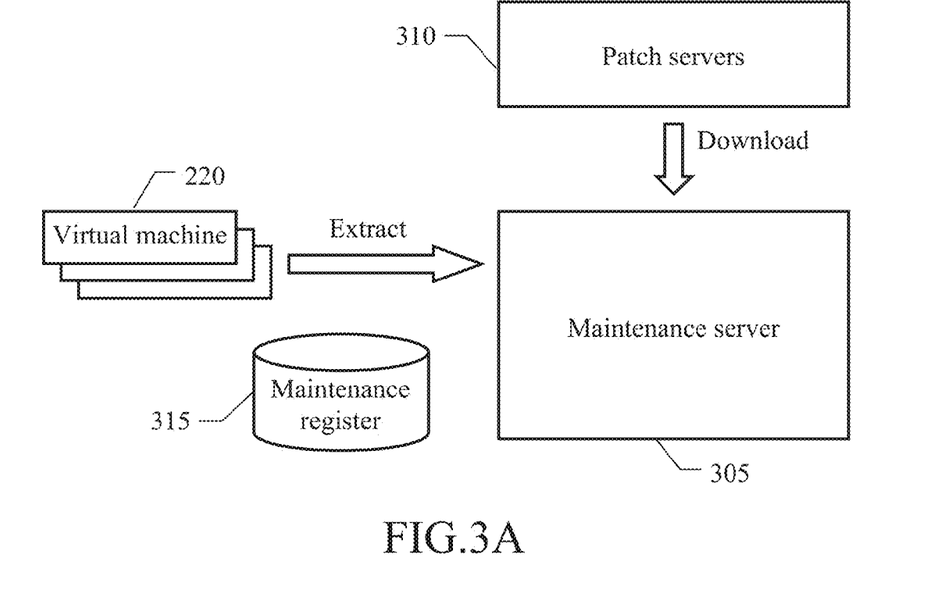
FIG. 3A to FIG. 3C show an exemplary scenario of application of an embodiment.
Figure 3B:
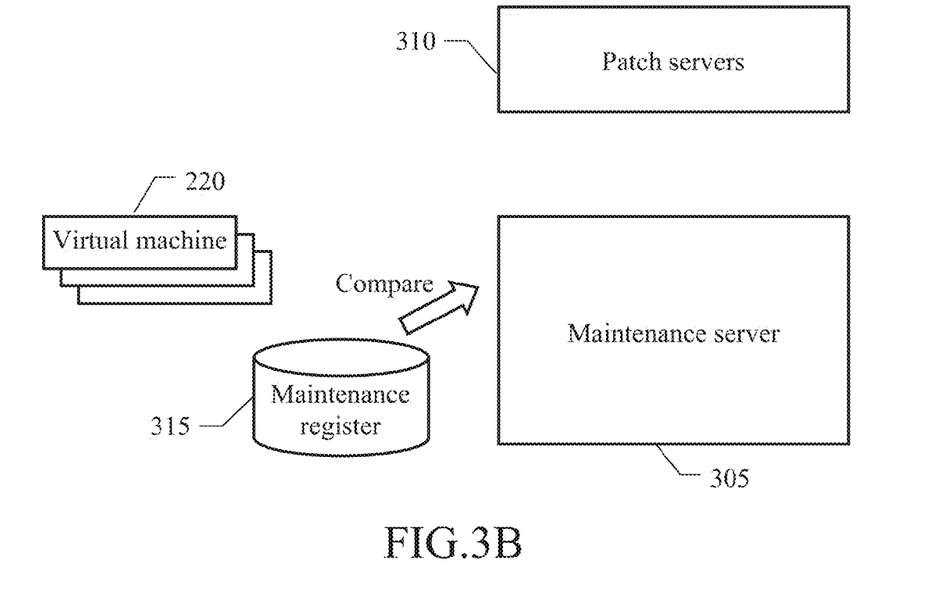
Figure 3C:
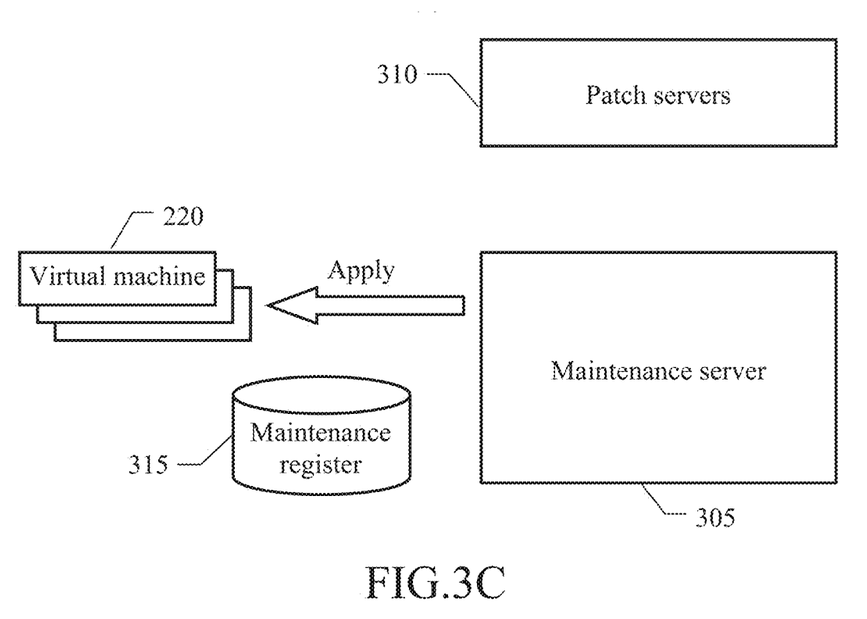

An exemplary scenario of application of the solution according to an illustrative embodiment is shown in the FIG. 3A to FIG. 3C.

Starting from the FIG. 3A, a maintenance server 305 of the data-processing center (implemented either as a physical computer or as a virtual machine) determines a list of software components installed on each virtual machine 220 (for example, by extracting the corresponding information from the descriptors of the virtual appliances wherein they are comprised). For each software component so determined, the maintenance server 305 retrieves a maintenance policy that is indicative of one or more patches that should be applied to the software component—for example, by downloading them from maintenance servers of the corresponding vendors (denoted as a whole with the reference 310).

Moving to the FIG. 3B, the maintenance server 305 then determines which (old) virtual machines 220 have at least one (old) software component that requires the application of one or more (new) patches. In the solution according to an illustrative embodiment, for this purpose the maintenance server 305 accesses a maintenance register 315, which is indicative of a current state of the software components of the virtual machines 220 (for example, their patch level); the old virtual machines 220 are determined according to a comparison among the maintenance policies and the maintenance register 315 (for example, by converting the maintenance policies into corresponding queries that are executed on the maintenance register 315, and possibly on the images of the virtual machines 220).

At this point, as shown in the FIG. 3C, the new patches (for example, downloaded from the same patch servers 310) are applied to the corresponding old software components in each old virtual machine 220; at the same time, the maintenance register 315 is updated according to the application of these new patches (for example, by upgrading the patch level of the old software components to which the new patches have been successfully applied).

The above-described solution according to an embodiment of the invention allows upgrading the virtual machines 220 without turning them online; therefore, the virtual machines 220 may be kept up-to-date even if they are left offline for long periods of time (for example, when the virtual machines 220 are turned online only sporadically, or when they are always offline because only used as master/template images). This allows preventing (or at least strongly mitigating) issues caused by missing patches, especially when they are relatively important (for example, because impairing proper operation of the software components or exposing them to security vulnerabilities).

Particularly, in the above-described solution the determination of the old virtual machines is relatively fast, and it may be performed with a reduced waste of system resources.

Moreover, this solution is of general applicability. The same solution is also quite effective, since it does not rely on any specific APIs of the operating systems of the virtual machines (which may be not available when they are offline).

Figure 4:
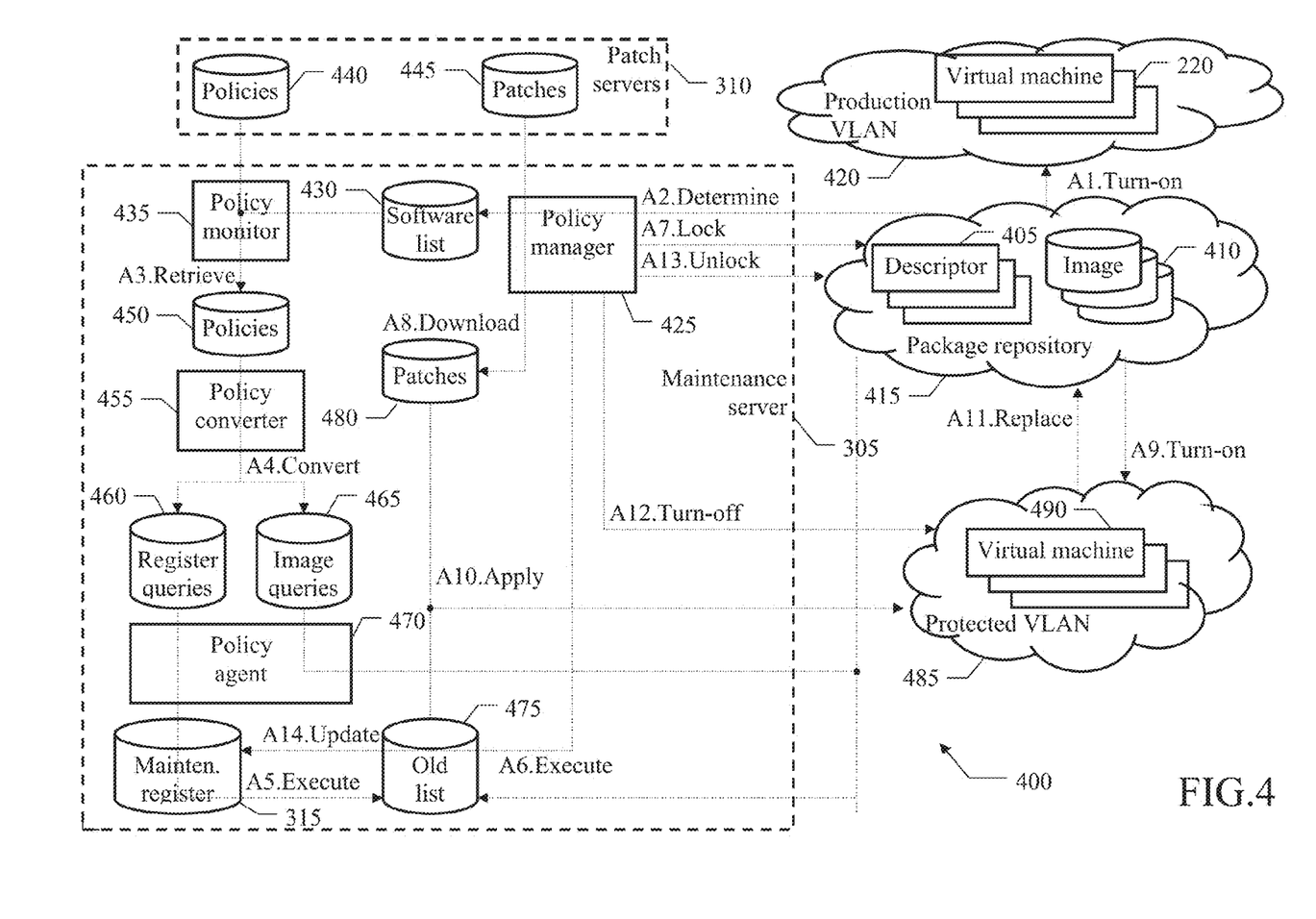
FIG. 4 shows a collaboration diagram representing the roles of the main software modules that may be used to implement an illustrative embodiment.

A collaboration diagram representing the roles of the main software modules that may be used to implement the solution according to an embodiment of the invention is shown in the FIG. 4. These software modules are denoted as a whole with the reference 400. The information (programs and data) is typically stored in the hard disk and loaded (at least partially) into the working memory of each computer when the programs are running. The programs are initially installed onto the hard disk, for example, from DVD-ROM. Particularly, the figure describes both the static structure of the software modules and their dynamic behavior (by means of a series of exchanged messages, each one representing a corresponding action, denoted with sequence numbers preceded by the symbol "A").

All the packages of the virtual appliances that are available in the data-processing center, with their descriptors 405 and (virtual disk) images 410, are stored in a package repository 410. Whenever any virtual appliance is actually to be used, its virtual machines 220 are turned online into a production Virtual Local Area Network (VLAN) 420 (action "A1.Turn-on").

A policy manager 425 of the maintenance server 305 creates a software list 430; the software list 430 is created by determining the software components of each virtual machine of the different virtual appliances that are available in the data-processing center from their descriptors 405—for example, each one identified by a qualified identifier formed by an identifier of the virtual appliance, an identifier of the virtual machine in the virtual appliance, and a (simple) identifier of the software component (A2.Determine"). A policy monitor 435 accesses the software list 430; for each software component indicated in the software list 430, the policy monitor 435 retrieves corresponding maintenance policies 440, each one indicative of a patch 445 that should be applied to the software component, from the patch server 310 of its vendor (such as via a corresponding bulletin board); for example, each maintenance policy 440 comprises the (qualified) identifier of the software component, its version and a patch level to which it should be brought, an identifier of the patch 445 to be applied, its brief description, a severity indicator thereof, and the names of one or more files to be updated together with corresponding information, such as their Cyclic Redundancy Check (CRC) value, security property, and the like. The policy monitor 435 stores the maintenance policies 440 so retrieved into the maintenance server 305, wherein they are denoted with the reference 450 (action "A3.Retrieve"). A policy converter 455 accesses the maintenance policies 450. The policy converter 455 converts each maintenance policy 450 into a register query 460 against the maintenance register 315 (indicative of a current state of all the software components of the virtual appliances) and possibly an image query 465 against the images 410 (action "A4.Convert").

A policy agent 470 accesses both the register queries 460 and the image queries 465. The policy agent 470 executes each register query 460 on the maintenance register 315. For example, the maintenance register 315 stores a record for each virtual appliance, which in turn stores a record for each virtual machine thereof, which in turn stores a record for each software component thereof; in the example at issue, the record of the software component comprises its version and patch level. In this case, the execution of each register query 460 verifies whether the version and patch level of the software component in the virtual machine of its virtual appliance differ from (i.e., they are older than) the ones indicated in the corresponding maintenance policy 450. For each register query whose result is positive (and then the corresponding patch has to be applied to the software component), the (qualified) identifier of the software component and the identifier of the patch to be applied are added to an old list 475 (action "A5.Execute"). For each register query 460 whose result is negative, instead, the policy agent 470 executes the corresponding image query 465 (for the same software component) on the images 410 of its virtual machines in its virtual appliance (in the package repository 415). For example, for this purpose the policy agent 470 mounts the images 410 (without instantiating the corresponding virtual machines), and then retrieves information about the files to be updated by the corresponding patch 445 (from its maintenance policy 450); in the example at issue, the execution of the image query 465 verifies whether the CRC and the security property of each file differ from the ones indicated in the corresponding maintenance policy 450. For each image query 465 whose result is positive (and then the corresponding patch has to be applied to the software component), the (qualified) identifier of the software component and the identifier of the patch to be applied are added to the old list 475 (action "A6.Execute").

In this way, the old list 475 will indicate all the (old) software components (in the different virtual machines of their virtual appliances) actually requiring the application of one or more (new) patches 445; preferably, the old software components are arranged in the old list 475 in order of application of the corresponding new patches 445 (for example, based on their severity indicators provided by the maintenance policies 450). This information may also be provided to a system administrator, who may select the new patches 445 to be actually applied and/or schedule their application manually.

In any case, for each new patch (indicated in the old list 475) the maintenance manager 425 retrieves its severity indicator (from its corresponding maintenance policy 450). If the severity indicator indicates that the new patch is important (for example, because failure to apply the patch impairs proper operation of the corresponding software component or exposes it to a security vulnerability), the maintenance manager 425 locks the image 410 of each corresponding old virtual machine (indicated in the old list 475); in this way, it is possible to prevent using the old virtual machines until any serious bugs of their software components have not been remedied (action "A7.Lock"). At this point, the policy manager 425 downloads all the new patches 445 (indicated in the old list 475) from the corresponding patch servers 310 onto the maintenance server 305, wherein they are denoted with the reference 480 (action "A8.Download"). The corresponding virtual machines (indicated in the old list 475) are then turned online in a protected VLAN 485 (completely isolated from the production VLAN 425), wherein they are denoted with the reference 490 (action "A9.Turn-on"). The policy manager 425 causes the application of the new patches 480 to the software components in the old virtual machines 490; for example, this result may be achieved by simple copying the new patches 480 into the corresponding old virtual machines 490 and then launching them (action "A10.Apply"). Once the correct operation of the (updated) virtual machines 490 (with the required new patches 480) has been verified, the maintenance manager 425 creates new images thereof, which replace the images 410 of the old virtual machines in the package repository 415—so as to ensure that the up-to-date version of the virtual machines are used when it is necessary (action "A11.Replace"). The maintenance manager 425 then turns the updated virtual machines 490 offline (action "A12.Turn-off"). The maintenance manager 425 also unlocks the images 410 of the updated virtual machines 490 in the package repository 415 (if necessary and possible), so as to allow their use again—which is now possible without problems because the corresponding bugs have been remedied (action "A13.Unlock"). At the end, the maintenance manager 425 updates the maintenance register 315 accordingly (so as to indicate the new status of the old software components, resulting from the application of the new patches 480 thereto, in the record of the updated virtual machines 490); for this purpose, it is enough to update the information in the corresponding records to the values indicated in the corresponding maintenance policies 450—i.e., version and patch level of each old software component, and CRC and security property of its updated files in the example at issue (action "A14.Update").

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, the terms include, comprise, have and contain (and any forms thereof should be intended with an open, non-exhaustive meaning (i.e., not limited to the recited items), the terms based on, dependent on, according to, function of and any forms thereof) should be intended as a non-exclusive relationship (i.e., with possible further variable involved), and the term a/an should be intended as one or more items (unless expressly indicated otherwise).

For example, an example embodiment provides a method for maintaining (one or more) virtual machines that are available in a data-processing system (of whatever type and based on any virtualization structure—such as with a hypervisor).

In another example embodiment, a list of (one or more) software components installed on each virtual machine (or any equivalent data structure) is determined.

A set of (one or more) maintenance policies is retrieved for each software component; each maintenance policy is indicative of a patch to be applied to the corresponding software component. However, the maintenance policies may have whatever format, may comprise any other equivalent information, or may be provided in any other way (even locally from a removable storage medium). Likewise, the patches may comprise any piece of software designed to fix whatever problems and/or to improve usability or performance; the patches may also be of different type (for example, hot fixes) or size (for example, service packs involving significant changes).

A set of (one or more) old virtual machines, having at least one old software component thereof that requires the application of at least a new one of the corresponding patches, is determined according to a comparison among the maintenance policies and a maintenance register (which is indicative of a current state of the software components of the virtual machines). However, the maintenance register may have whatever format or may comprise any other equivalent information.

The corresponding new patch (or more) is applied to each old software component of each old virtual machine. The maintenance register is then updated according to the application of said new patch (or more) to each old software component of each old virtual machine.

However, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

In an example embodiment, the virtual machines are offline in the data-processing system.

However, the application of the same method to online virtual machines as well (for example, by forcing their turning offline for the application of the required patches) is not excluded.

In one example embodiment, a set of virtual appliances is available in the data-processing system; each virtual appliance comprises a subset of the virtual machines and a descriptor of the corresponding virtual machines and of the software components installed thereon. In this case, an indication of the software components installed on the virtual machines of each virtual appliance is extracted from the corresponding descriptor.

However, the descriptor may have any other format (even of the proprietary type) or may comprise any other equivalent information; more generally, the same method may be applied to generic virtual machines (even if they are not comprised in any virtual appliance).

In an example embodiment, a register query against the maintenance register is generated from each maintenance policy. Each register query is then executed on the maintenance register; the old software components are determined according to a result of the execution of the corresponding register queries.

However, each maintenance query may have any other format (even comprising multiple instructions) and may be based on equivalent information.

In one embodiment, each virtual machine comprises a set of (one or more virtual disk images. An image query against the virtual disk images of the corresponding virtual machine is generated from each maintenance policy; each image query is then executed on the corresponding virtual disk images; the old software components are further determined according to a result of the execution of the corresponding image queries.

However, each image query may have any other format (even comprising multiple instructions) and may be based on equivalent information; in any case, this feature may be omitted in a simplified implementation (wherein the old software components are determined only according to the maintenance register).

In an example embodiment, for this purpose the corresponding virtual disk images are mounted in a maintenance environment.

However, the image queries may also be executed in a different way (for example, by sending messages to the virtual machines) or in any equivalent maintenance environment even separate from the maintenance server.

In one embodiment, the old virtual machine is turned online in a protected environment. The corresponding new patch (or more) is applied to each old software component of the old virtual machine in the protected environment. The old virtual machine is then turned offline.

However, the patches may be applied in any other way, even without turning online the corresponding virtual machines (for example, by replacing the required files in the corresponding virtual disk images directly).

In an example embodiment, a use of the old virtual machine is locked in response to the determination thereof; the use of the old virtual machine is then unlocked in response to a successful application of the corresponding new patch (or more) to each old software component thereof.

However, the possibility of allowing the use of the old virtual machines even before the application of the corresponding patches is not excluded.

In one embodiment, this means locking a turning online and/or a cloning of the old virtual machine.

However, it is also possible to lock only the turning online or only the cloning of the old virtual machine, or any other use thereof (for example, the creation of new virtual machines using it as a template).

In an example embodiment, each maintenance policy comprises a severity indicator; the locking of the use of the old virtual machine is enabled according to the severity indicator of the maintenance policies corresponding to the new patch (or more) of the old software components thereof.

However, the severity indicator may have any other format and/or value (for example, based on a numerical scale of severity). In any case, it is possible to enable the locking only for specific categories of the new patches (for example, security patches) or even for all the virtual machines independently of the severity of the new patches to be applied to their software components.

An illustrative embodiment provides a computer program, which comprises code means for causing a data-processing system (for example, the above-described data-processing center) to perform the steps of the proposed method when the computer program is executed on the system.

However, the program may be implemented as a stand-alone module, as a plug-in for a management tool, or even directly in the management tool itself. It would be readily apparent that it is also possible to deploy the same solution as a service that is accessed through a network (such as in the Internet). In any case, similar considerations apply if the program is structured in a different way, or if additional modules or functions are provided; likewise, the memory structures may be of other types, or may be replaced with equivalent entities (not necessarily consisting of physical storage media). The program may take any form suitable to be used by any data-processing system or in connection therewith (for example, within a virtual machine), thereby configuring the system to perform the desired operations; particularly, the program may be in the form of external or resident software, firmware, or micro-code (either in object code or in source code—for example, to be compiled or interpreted). Moreover, if is possible to provide the program on any computer-usable medium (and particularly as an article of manufacture on a non-transitory medium); the medium may be any element suitable to contain, store, communicate, propagate, or transfer the program. For example, the medium may be of the electronic, magnetic, optical, electromagnetic, infrared, or semiconductor type; examples of such medium are fixed disks (where the program may be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware suitably programmed or otherwise configured.

An illustrative embodiment provides a data-processing system, which comprises means for performing the steps of the same method.

However, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries. More specifically, the same method may also be carried out on a data-processing system based on a different architecture (for example, a local, wide area, global, cellular or satellite network), and exploiting any type of (wired and/or wireless) connections; moreover, its implementation on a stand-alone computer is not excluded. In any case, each computer may have another structure or may comprise similar elements (such as cache memories temporarily storing the programs or parts thereof); moreover, it is possible to replace the computer with any code execution entity, either based on a physical machine or a virtual machine (such as a PDA, a mobile phone, and the like), or with a combination of multiple entities (such as a multi-tier architecture, a grid computing infrastructure, and the like).

The invention claimed is:

1. A method for maintaining a set of virtual appliances being available in a data-processing system, the method comprising:
    determining a list of software components installed on each virtual machine of each virtual appliance;
    retrieving a set of maintenance policies for each software component, each maintenance policy being indicative of a patch to be applied to the corresponding software component, wherein each maintenance policy comprises a severity indicator;
    generating a register query against a maintenance register from each maintenance policy, wherein the maintenance register stores a record for each virtual appliance, which in turn stores a record for each virtual machine thereof, which in turn stores a record for each software component thereof, wherein the record for each software component stores a version and patch level;
    executing each register query on the maintenance register;
    determining a given old virtual machine having at least one old software component thereof requiring application of a new patch according to a comparison between a given maintenance policy and the maintenance register according to a result of the execution of the register queries, wherein the given old virtual machine is a master template image of a virtual machine that is always offline in the data-processing system;
    locking cloning of the given virtual machine responsive to determining the severity indicator of the given maintenance policy indicates the new patch is important;
    applying the corresponding new patch to each old software component of the given old virtual machine; and
    responsive to successful application of the new patch to the given old virtual machine, updating the maintenance register and unlocking cloning of the given old virtual machine.

2. The method of claim 1, wherein the virtual machine offline in the data-processing system.

3. The method of claim 2, wherein applying the corresponding at least one new patch to each old software component of each old virtual machine comprises:
    turning online the old virtual machine in a protected environment;
    applying the corresponding at least one new patch to each old software component of the old virtual machine in the protected environment; and
    turning offline the old virtual machine.

4. The method of claim 3, wherein applying the corresponding at least one new patch to each old software component of each old virtual machine comprises:
    locking use of the old virtual machine in response to the determination of the old virtual machine; and unlocking the use of the old virtual machine in response to a successful application of the corresponding at least one new patch to each old software component of the old virtual machine.

5. The method of claim 4, wherein applying the corresponding at least one new patch to each old software component of each old virtual machine comprises:
enabling the locking of the use of the old virtual machine according to the severity indicator of the maintenance policies corresponding to the at least one new patch of the old software components of the old virtual machine.

6. The method of claim 1, wherein each virtual appliance comprises a subset of the virtual machines and a descriptor of the corresponding virtual machines and of the software components installed thereon, and wherein determining the list of software components installed on each virtual machine comprises:
extracting an indication of the software components installed on the virtual machines of each virtual appliance from the corresponding descriptor.

7. The method of claim 1, wherein each virtual machine comprises a set of virtual disk images, wherein determining the set of old virtual machines comprises:
generating an image query against the virtual disk images of the corresponding virtual machine from each maintenance policy; and
executing each image query on the corresponding virtual disk images, the old software components of a given old virtual machine being determined according to a result of the execution of a corresponding image query.

8. The method of claim 7, wherein executing each image query comprises:
mounting the corresponding virtual disk images in a maintenance environment.

9. A computer program product comprising a non-transitory computer readable storage medium having computer readable program code stored thereon for causing a data-processing system to:
determine a list of software components installed on each virtual machine of each virtual appliance;
retrieve a set of maintenance policies for each software component, each maintenance policy being indicative of a patch to be applied to the corresponding software component, wherein each maintenance policy comprises a severity indictor;
generating a register query against a maintenance register from each maintenance policy, wherein the maintenance register stores a record for each virtual appliance, which in turn stores a record for each virtual machine thereof, which in turn stores a record for each software component thereof, wherein the record for each software component stores a version and patch level;
executing each register query on the maintenance register;
determine a given old virtual machine having at least one old software component thereof requiring application of a new patch according to a comparison between a given maintenance policy and the maintenance register according to a result of the execution of the register queries, wherein the given old virtual machine is a master template image of a virtual machine that is always offline in the data-processing system;
lock cloning of the given virtual machine responsive to determining the severity indicator of the given maintenance policy indicates the new patch is important;
apply the corresponding new patch to each old software component of the given old virtual machine; and responsive to successful application of the new patch to the given old virtual machine, update the maintenance register and unlock cloning of the given old virtual machine.

10. The computer program product of claim 9, wherein each virtual machine comprises a set of virtual disk images, wherein determining the set of old virtual machines comprises:
generating an image query against the virtual disk images of the corresponding virtual machine from each maintenance policy; and
executing each image query on the corresponding virtual disk images, the old software components of a given old virtual machine being determined according to a result of the execution of a corresponding image query.

11. The computer program product of claim 10, wherein executing each image query comprises:
mounting the corresponding virtual disk images in a maintenance environment.

12. The computer program product of claim 9, wherein the virtual machines are offline in the data-processing system and wherein applying the corresponding at least one new patch to each old software component of each old virtual machine comprises:
turning online the old virtual machine in a protected environment;
applying the corresponding at least one new patch to each old software component of the old virtual machine in the protected environment; and
turning offline the old virtual machine.

13. The computer program product of claim 12, wherein applying the corresponding at least one new patch to each old software component of each old virtual machine comprises:
locking use of the old virtual machine in response to the determination of the old virtual machine; and
unlocking the use of the old virtual machine in response to a successful application of the corresponding at least one new patch to each of software component of the old virtual machine.

14. The computer program product of claim 13, wherein applying the corresponding at least one new patch to each old software component of each old virtual machine comprises:
enabling the locking of the use of the old virtual machine according to the severity indicator of the maintenance policies corresponding to the at least one new patch of the old software components of the old virtual machine.

15. A data-processing system comprising:
a processor; and
a memory coupled to the processor, wherein the memory comprises instructions which, when executed by the processor, cause the processor to:
determine a list of software components installed on each virtual machine of each virtual appliance;
retrieve a set of maintenance policies for each software component, each maintenance policy being indicative of a patch to be applied to the corresponding software component, wherein each maintenance policy comprises a severity indictor;
generating a register query against a maintenance register from each maintenance policy, wherein the maintenance register stores a record for each virtual appliance, which in turn stores a record for each virtual machine thereof; which in turn stores a record for each software component thereof, wherein the record for each software component stores a version and patch level;

executing each register query on the maintenance register;
determine a given old virtual machine having at least one old software component thereof requiring application of at least one new patch according to a comparison between a given maintenance policy and the maintenance register according to a result of the execution of the register queries, wherein the given old virtual machine is a master template image of a virtual machine that is always offline in the data-processing system;
lock cloning of the given virtual machine responsive to determining the severity indicator of the given maintenance policy indicates the new patch is important;
apply the corresponding new patch to each old software component of the given old virtual machine; and
responsive to success application of the new patch to the given old virtual machine, update the maintenance and unlock cloning of the given old virtual machine.

16. The data-processing system of claim 15, wherein each virtual machine comprises a set of virtual disk images, wherein determining the set of old virtual machines comprises:
generating an image query against the virtual disk images of the corresponding virtual machine from each maintenance policy; and
executing each image query on the corresponding virtual disk images, the old software components of a given old virtual machine being determined according to a result of the execution of a corresponding image query.

17. The data-processing system of claim 16, wherein executing each image query comprises:
mounting the corresponding virtual disk images in a maintenance environment.

18. The data-processing system of claim 15, wherein the virtual machines are offline in the data-processing system and wherein applying the corresponding at least one new patch to each old software component of each old virtual machine comprises:
turning online the old virtual machine in a protected environment;
applying the corresponding at least one new patch to each old software component of the old virtual machine in the protected environment; and
turning offline the old virtual machine.

19. The data-processing system of claim 18, wherein applying the corresponding at least one new patch to each old software component of each old virtual machine comprises:
locking use of the old virtual machine in response to the determination of the old virtual machine; and
unlocking the use of the old virtual machine in response to a successful application of the corresponding at least one new patch to each old software component of the old virtual machine.

20. The data-processing system of claim 19, wherein applying the corresponding at least one new patch to each old software component of each old virtual machine comprises:
enabling the locking of the use of the old virtual machine according to the severity indicator of the maintenance policies corresponding to the at least one new patch of the old software components of the old virtual machine.

* * * * *